(12) United States Patent
Harris et al.

(10) Patent No.: US 12,553,878 B2
(45) Date of Patent: Feb. 17, 2026

(54) SENSOR FOR TRANSFORMER CONDITION ASSESSMENT

(71) Applicant: Aurtra Pty Ltd, Brisbane (AU)

(72) Inventors: Richard Allen Harris, Brisbane (AU); Junhyuck Seo, Brisbane (AU)

(73) Assignee: Aurtra Pty Ltd, Brisbane (AU)

( * ) Notice: Subject to any disclaimer, the term of this patent is extended or adjusted under 35 U.S.C. 154(b) by 479 days.

(21) Appl. No.: 17/427,305

(22) PCT Filed: Nov. 20, 2019

(86) PCT No.: PCT/AU2019/051277
§ 371 (c)(1),
(2) Date: Jul. 30, 2021

(87) PCT Pub. No.: WO2020/160590
PCT Pub. Date: Aug. 13, 2020

(65) Prior Publication Data
US 2022/0128539 A1   Apr. 28, 2022

(30) Foreign Application Priority Data

Feb. 5, 2019   (AU) .................................. 2019900349

(51) Int. Cl.
*G01N 33/28* (2006.01)
*G01R 31/62* (2020.01)

(52) U.S. Cl.
CPC ..... *G01N 33/2888* (2013.01); *G01N 33/2805* (2013.01); *G01R 31/62* (2020.01)

(58) Field of Classification Search
CPC ........... G01N 33/2888; G01N 33/2805; G01R 31/62; G01R 31/1272; Y04S 40/18;
(Continued)

(56) References Cited

U.S. PATENT DOCUMENTS 7,081,757 B2 * 7/2006 Unsworth .............. H01H 33/26
 324/536
8,707,767 B2 * 4/2014 Herz .................... G01N 33/005
 73/61.43

(Continued)

FOREIGN PATENT DOCUMENTS

CN   208254542 U   * 12/2018
EP   1786083 A1   5/2007
(Continued)

OTHER PUBLICATIONS

International Search Report corresponding to International Patent Application No. PCT/AU2019/051277, mailed Feb. 24, 2020 (4 pages).

(Continued)

*Primary Examiner* — Shelby A Turner
*Assistant Examiner* — Yaritza H Perez Bermudez
(74) *Attorney, Agent, or Firm* — ICE MILLER LLP; Justin D. Swindells

(57) ABSTRACT

A sensor assembly for monitoring an internal condition of a transformer. The assembly includes: a body for location outside a tank of the transformer, the body housing an electronics assembly including body sensors coupled to a processor; a probe extending from the body for insertion into a tank of the transformer; a number of probe sensors coupled to the processor disposed at or toward a remote end of the probe for sensing conditions within the tank. The processor is configured to process signals from the probe sensors and the body sensors to produce signals for assessing one or more of: transformer core temperature; transformer insulation state; partial discharge; mechanical state of transformer; chemical state of transformer.

19 Claims, 11 Drawing Sheets

(58) Field of Classification Search
CPC .............. H04Q 9/00; H04Q 2209/40; H01F 2027/404; H01F 2027/406; H01F 27/402; H04L 67/12; H04W 4/80; H04W 4/18; H04W 4/70; G08C 17/02; G08C 2200/00; G08B 21/187

See application file for complete search history.

(56) References Cited

U.S. PATENT DOCUMENTS

| | | | | |
|---|---|---|---|---|
| 9,128,477 | B2* | 9/2015 | Stenestam | G01R 31/62 |
| 10,145,830 | B2 | 12/2018 | Fenton | |
| 10,761,147 | B2* | 9/2020 | Beaudet | G01R 31/40 |
| 11,550,000 | B2* | 1/2023 | Bayoumi | G01R 15/181 |
| 2009/0253388 | A1* | 10/2009 | Kielb | G01D 21/00 |
| | | | | 455/117 |
| 2014/0042199 | A1* | 2/2014 | Gregory, Jr. | B60R 7/02 |
| | | | | 29/700 |
| 2014/0347091 | A1 | 11/2014 | Jung | |
| 2015/0091598 | A1* | 4/2015 | Han | G01R 31/1227 |
| | | | | 324/754.21 |
| 2017/0011612 | A1* | 1/2017 | Jain | G08B 21/182 |
| 2017/0168034 | A1* | 6/2017 | Fenton | G01K 13/02 |
| 2017/0213641 | A1* | 7/2017 | Hamberger | G01R 33/02 |
| 2018/0128673 | A1* | 5/2018 | Oshetski | G01R 31/62 |

FOREIGN PATENT DOCUMENTS

| | | | | |
|---|---|---|---|---|
| WO | 0218963 | A1 | 3/2002 | |
| WO | 2018165636 | A8 | 9/2018 | |
| WO | WO-2018165636 | A1* | 9/2018 | ............ G01D 21/02 |

OTHER PUBLICATIONS

Written Opinion of International Searching Authority corresponding to International Patent Application No. PCT/AU2019/051277, mailed Feb. 24, 2020 (5 pages).

Written Opinion of International Searching Authority corresponding to International Patent Application No. PCT/AU2019/051277, mailed Jan. 11, 2021 (4 pages).

International Preliminary Report on Patentability corresponding to International Patent Application No. PCT/AU2019/051277, mailed Jun. 3, 2021 (21 pages).

Tenbohlen, S.; "PD Monitoring of Power Transformers by UHF Sensors"; Conference Proceedings of ISEIM 2017, Sep. 2017, pp. 1-4 (5 pages).

European Patent Office; Extended European Search Report for Application No. 19914364.5, dated Mar. 14, 2022 (15 pages).

Dukanac, D. et al.; "Application of UHF method for partial discharge source location in power transformers"; IEEE Transactions on Dielectrics and Electrical Insulation, IEEE Service Center, Piscataway, New Jersey, vol. 25, No. 6, pp. 2266-2278; Dec. 1, 2018; XP011704296; ISSN: 1070-9878 (13 pages).

Coenen, S. et al.; "Location of PD sources in power transformers by UHF and acoustic measurements"; IEEE Transactions on Dielectrics and Electrical Insulation, IEEE Service Center, Piscataway, New Jersey, vol. 19, No. 6, pp. 1934-1940; Dec. 1, 2012; XP011487298; ISSN: 1070-9878 (7 pages).

Mominul, I. et al.; "A review of condition monitoring techniques and diagnostic tests for lifetime estimation of power transformers"; Electrical Engineering, Springer, Berlin, Germany, vol. 100, No. 2, pp. 581-605; Apr. 13, 2017; XP036505313; ISSN: 0948-7921 (25 pages).

* cited by examiner

SENSOR FOR TRANSFORMER CONDITION ASSESSMENT

CROSS-REFERENCE TO RELATED APPLICATIONS

This application is a U.S. National Stage of International Application No. PCT/AU2019/051277, filed Nov. 20, 2019, which claims the benefit of Australian Patent Application No. 2019900349, filed Feb. 5, 2019, both of which are incorporated herein by reference in their entireties.

TECHNICAL FIELD

This invention relates to a method and apparatus that is suitable for determining the internal condition of electricity transmission and distribution transformers.

BACKGROUND

The discussion of any prior art documents, techniques, methods or apparatus is not to be taken to constitute any admission or evidence that such prior art forms, or ever formed, part of the common general knowledge.

Transformers can be separated in to maintainable and unmaintainable parts. External parts, including tap-changers, insulators, pumps, radiator assemblies and the like can be maintained over life or replaced as necessary. However, the internal components cannot. The internal components such as the winding and insulation of a transformer cannot be directly assessed for damage or aging because they are sealed inside the transformer tank and so are unobservable. It is most common that the transformer end-of-life is reached once the internal components have aged to the point that external maintenance is not cost effective given the life left (or perceived risk of internal failure).

The most commonly used technique to assess the state of the transformer insulation is to measure the quantity of moisture and other chemicals in the tank oil that surrounds the coils.

A high moisture level in transformer tank oil is known to be damaging and indicative of insulation age or near end of life. The existence of other volatile chemicals indicates discharges within the transformer which indicate insulation age, damage and potential failure risk. A typical method for completing the assessment is to sample the oil and send it for chemical analysis at a specialist laboratory or to install expensive online systems which conduct the chemical analysis of the oil continuously. Charts are available (developed over many decades) which relate the measured levels to various symptoms, problems and characteristics and the need for maintenance. These charts are published by various organizations including the international standards bodies (IEEE and IEC).

The process of physical sampling and laboratory testing of oil is expensive and so can only be completed sporadically. Due to sampling and testing errors the results also are of low quality and always in need of considerable interpretation. Existing online monitoring techniques are even more expensive. Interpretation of the results is complicated and requires considerable engineering expertise. As a result, especially on-line techniques are typically only used on the largest most critical transformers (typically >10 MVA), while physical sampling techniques are used sparingly. Transformers under approximately 10 MVA, although in aggregate comprising the vast majority of the asset cost base of a typical electrical utility, are individually too small to justify the high expense. As a result, these smaller transformers are managed very conservatively (e.g. run under low load) when older and taken out of service earlier than really necessary.

Moisture measurement is a critical parameter to understanding the age of the insulation within the transformer and the mechanical state of the paper with regard to the way it affects transformer performance. This problem has also been widely studied over decades. At start-of-life, the paper insulation within a transformer consists of long intertwined cellulose chains which make it structurally strong, tough and durable for mechanical and electrical stresses. Over time, chemical breakdown of these chains ultimately makes the paper mechanically weak, brittle and unable to withstand normal operating mechanical stresses, caused mainly by heating cycles and transient electrical forces. Cracks and breaks become more probable, and with them, the risk of electrical breakdown and structural instability under high (although not necessarily unexpected) electrical stresses.

Notwithstanding these challenges, the problem of transformer aging has an even more complex dimension. The state of the paper other than its polymer age (in particular its water content) affects the insulating qualities of the transformer in a number of important ways. The paper over time in fact becomes a store of any water created or entering the transformer. Water in the transformer oil is effectively mopped up by the paper. This leaves less than a few percent of the total transformer water in the oil at any time, masking the true progress of water ingress.

Understanding how the moisture in the paper affects the insulating quality of the paper and the oil is not straight forward. Moisture accelerates paper polymer breakdown directly, therefore accelerating end-of-safe-life. In addition, water in the insulation directly limits the safe operating envelope of the transformer in many ways such as causing bubbles of liquid or water vapour to form under certain conditions. These processes are directly related to the extent of the moisture in the paper. In addition, water movement in and out of the paper under different temperature profiles affects the breakdown strength of the oil—which can cause highly hazardous short-lived states.

Another phenomenon that occurs in aging transformers due to insulation age and other causes of localized breakdown of the transformer insulation is that of "partial discharge".

Partial discharge is a phenomenon that occurs to some extent in all transformers and which is a significant threat to the health of a transformer. Partial discharge occurs due to the high electric fields within the transformer being concentrated by insulation discontinuities (as a result of manufacture or aging). This field concentration can exceed the breakdown strength of the material at the site of the discontinuity and a small, i.e. "partial", discharge can result. Typically, this occurs in an internal layer of the paper insulation and the impulse strength of the remaining layers is suitable to prevent catastrophic breakdown. So typically, the partial discharge occurs within the insulation with no further consequence. However, as the paper ages, these discharges can cumulatively damage the surrounding paper, or if the insulation is damaged by other electric or mechanical events, or if the oil break down strength is compromised, the risk of out-of-control avalanching breakdown becomes significant. All transformers old or new display some level of partial discharge. Significant increases in the level of partial discharge though are a clear indicator of increasing risk of failure.

Partial discharge produces many symptoms. Electrical noise on the main conductors, electric noise within the transformer auxiliary systems, acoustic noise, vibration and electromagnetic interference concentrated in specific bands, also chemical changes in the oil (for example hydrogen concentration increase). However, all these signals can also be created by other sources. For example, electromagnetic signals are produced by electrical switching in sub-station or from external sources (such as radio transmissions). Similarly, hydrogen can be caused by oil-metal chemical reaction within transformers rather than oil breakdown from discharges. Acoustic noise can be caused by many forms of environmental effects. So, the problem of measuring partial discharge using any one of these sensors alone is a difficult one.

It is generally agreed within industry that techniques to integrate smaller transformers into an active real-time condition based management program will create considerable value. But in order to do this, low-cost solutions are needed which can be rolled out fleet wide and installed in both large and small transformers.

It is an object of the present invention to provide a transformer condition sensor that is compact and which can be retrofitted into existing electrical transmission and distribution transformers in order to provide information regarding the operational condition of the transformers.

SUMMARY OF THE INVENTION

According to a first aspect of the present invention there is provided a sensor assembly for monitoring an internal condition of a transformer comprising:
- a body for location outside a tank of the transformer, the body housing an electronics assembly including body sensors coupled to a processor;
- a probe extending from the body for insertion into a tank of the transformer; a number of probe sensors coupled to the processor disposed at or toward a remote end of the probe for sensing conditions within the tank;
- wherein the processor is configured to process signals from the probe sensors and the body sensors to produce signals for assessing one or more of: transformer core temperature; transformer insulation state; partial discharge; mechanical state of transformer; chemical state of transformer.

In an embodiment one of the probe sensors comprises an oil temperature sensor for measuring a temperature of oil in the tank, and one of the body sensors comprises a body temperature sensor for measuring a temperature of the body.

In an embodiment the probe sensors comprise a remote temperature sensor for sensing a temperature at a location on the transformer tank.

In an embodiment the assembly includes a heat block for isolating the flow of heat from the probe to the body.

In an embodiment the heat block comprises a ceramic material.

In an embodiment the heat block is comprised of high temperature plastic material.

In an embodiment the heat block comprises a part of a coupler that couples the probe to the body.

In an embodiment the electronics assembly includes an RF Data communication interface sub-assembly coupled to the processor for the processor to transmit the signals to a remote server.

In an embodiment wherein the body includes a RF transparent window, for passage of RF signals between the RF communication interface sub-assembly and the remote transceiver.

In an embodiment one of the probe sensors comprises a radio-frequency antenna for sensing EM radiation due to partial discharges during operation of the transformer, said antenna having an electrically short antenna of length less than ¼ of a wavelength of the EM radiation wherein the processor is configured to produce signals indicating presence of a partial discharge taking into account a signal from the antenna.

In an embodiment the electronic assembly includes a MIMIC which is responsive to the antenna and which includes an automatic-gain-control (AGC) circuit wherein the processor is responsive to the AGC circuit to produce the signals indicating the presence of the partial discharge.

In an embodiment the body sensors include a vibration sensor.

In an embodiment the body sensors include an acoustic sensor.

In an embodiment the vibration sensor and the acoustic sensor comprise an accelerometer configured to measure vibration from the tank from sub hertz frequencies up to audible frequencies above 1000 Hz.

In an embodiment one of the body sensors comprises a magnetic field sensor for sensing magnetic fields associated with operation of the transformer.

In an embodiment one of the probe sensors comprise a hydrogen sensor for sensing hydrogen concentration in the tank.

In an embodiment one of the probe sensors comprises a moisture sensor.

In an embodiment the processor is arranged to pre-process signals from said sensors and transmit pre-processed data to the remote server for the remote server to determine one or more of: transformer core temperature; transformer insulation state; partial discharge; mechanical state of transformer; chemical state of transformer.

According to another aspect of the invention there is provided the sensor assembly for monitoring an internal condition of a transformer in combination with a remote server, wherein the processor and/or the remote server are configured to determine a transformer load condition taking into account signals from the oil temperature sensor and the body temperature sensor. The remote server may be any one or more computational devices suitably programmed according to the methods described herein.

In an embodiment the assembly includes a remote temperature sensor for sensing a temperature at a location on the transformer tank and wherein the processor and/or the remote server are configured to determine the transformer load condition further taking into account a signal from the remote temperature sensor.

In an embodiment the body sensors include at least one of a vibration sensor and an acoustic sensor and wherein the processor and/or the remote server are configured to further take into account signals from the vibration sensor and/or the acoustic sensor for determining the transformer load condition.

In an embodiment the body sensors include a magnetic field sensor and wherein the processor and/or the server is configured to determine the load of the transformer taking into account signals from the magnetic field sensor.

In an embodiment the processor and/or the server are configured to calibrate signals from the magnetic field sensor with a measured transformer current value for determining an absolute load of the transformer.

In an embodiment the processor and/or the server are configured to take into account signals from the oil temperature sensor, the remote temperature sensor and the body temperature sensor and the magnetic field sensor for determining a load of the transformer.

In an embodiment the processor and/or the server are configured to produce signals indicating mechanical conditions including one or more of: core winding damage; loss of clamping pressure; and transformer tap malfunction such as excessive tap change noise and tap hunting.

In an embodiment the processor and/or server are configured to produce a signal indicating core temperature of the transformer taking into account signals from at least the oil temperature sensor and the body temperature sensor.

In an embodiment the processor and/or server are configured to produce a signal indicating core temperature of the transformer taking into account signals from the oil temperature sensor, the body temperature sensor and the remote temperature sensor.

In an embodiment one of the probe sensors includes a moisture sensor and the processor and/or the server are configured to produce a signal indicating transformer insulation state taking into account a signal from the moisture sensor.

According to a further aspect of the present invention there is provided a method for assessing an internal condition of a transformer comprising:
  installing a plurality of internal sensors within the transformer;
  installing a number of external sensors adjacent an outside surface of the transformer;
  monitoring signals from the sensors including sampling the signals simultaneously;
  making an assessment of the internal condition of the transformer based on a correlation of all of the signals sampled simultaneously.

According to a further aspect of the present invention, there is provided a system for assessing an internal condition of a transformer comprising:
  a transformer sensor including a body for location outside a tank of the transformer, the body housing an electronics assembly including body sensors coupled to a processor and a probe extending from the body for insertion into a tank of the transformer with a number of probe sensors coupled to the processor disposed at or toward a remote end of the probe for sensing conditions within the tank and a data communications interface coupled to the processor for transmitting data gathered from the probe sensors and the body sensors to a remote server for post-processing;
  the remote server in data communication with the transformer server wherein the remote server is configured to process the data gathered from the probe sensors and the body sensors to produce signals indicating one or more of: transformer core temperature; transformer insulation state; partial discharge; mechanical state of transformer; chemical state of transformer.

According to another aspect of the present invention, there is provided a transformer sensor including:
  a body for location outside a tank of the transformer, the body housing an electronics assembly including at least one magnetic field sensor coupled to a processor and a probe extending from the body for insertion into a tank of the transformer with a probe antenna for detecting EM radiation associated with partial discharge at or toward a remote end of the probe;
  wherein the processor is configured to correlate signals corresponding to the probe antenna and to the magnetic field sensor to detect partial discharges occurring during operation of the transformer.

According to a further aspect of the present invention there is provided a transformer sensor including:
  a body for location outside a tank of the transformer, the body housing an electronics assembly including at least one body temperature sensor coupled to a processor and a probe extending from the body for insertion into a tank of the transformer including a probe temperature sensor coupled to the processor located at or toward a remote end of the probe for detecting temperature within the tank; and a heat block disposed between the probe and the body for preventing conduction of heat from the probe to the body;
  wherein the processor is configured to estimate an ambient outside temperature taking into account signals from the probe temperature sensor and the body temperature sensor.

According to a final aspect of the present invention there is provided a transformer sensor including:
  a body for location outside a tank of the transformer, the body housing an electronics assembly including at least one sensor coupled to a processor and a probe extending from the body for insertion into a tank of the transformer including at least one sensor coupled to the processor located at or toward a remote end of the probe for detecting temperature within the tank; and
  a data interface sub-assembly coupled to the processor for transmitting data signals from the processor based on signals from said sensors to a remote site.

In a preferred embodiment, the remote site comprises a remote server which completes some procedures of the processing that will be described instead of or in concert with the processor.

BRIEF DESCRIPTION OF THE DRAWINGS

The Detailed Description is not to be regarded as limiting the scope of the preceding Summary of the Invention in any way. The Detailed Description will make reference to a number of drawings as follows.

DETAILED DESCRIPTION OF PREFERRED EMBODIMENT

Figure 1:
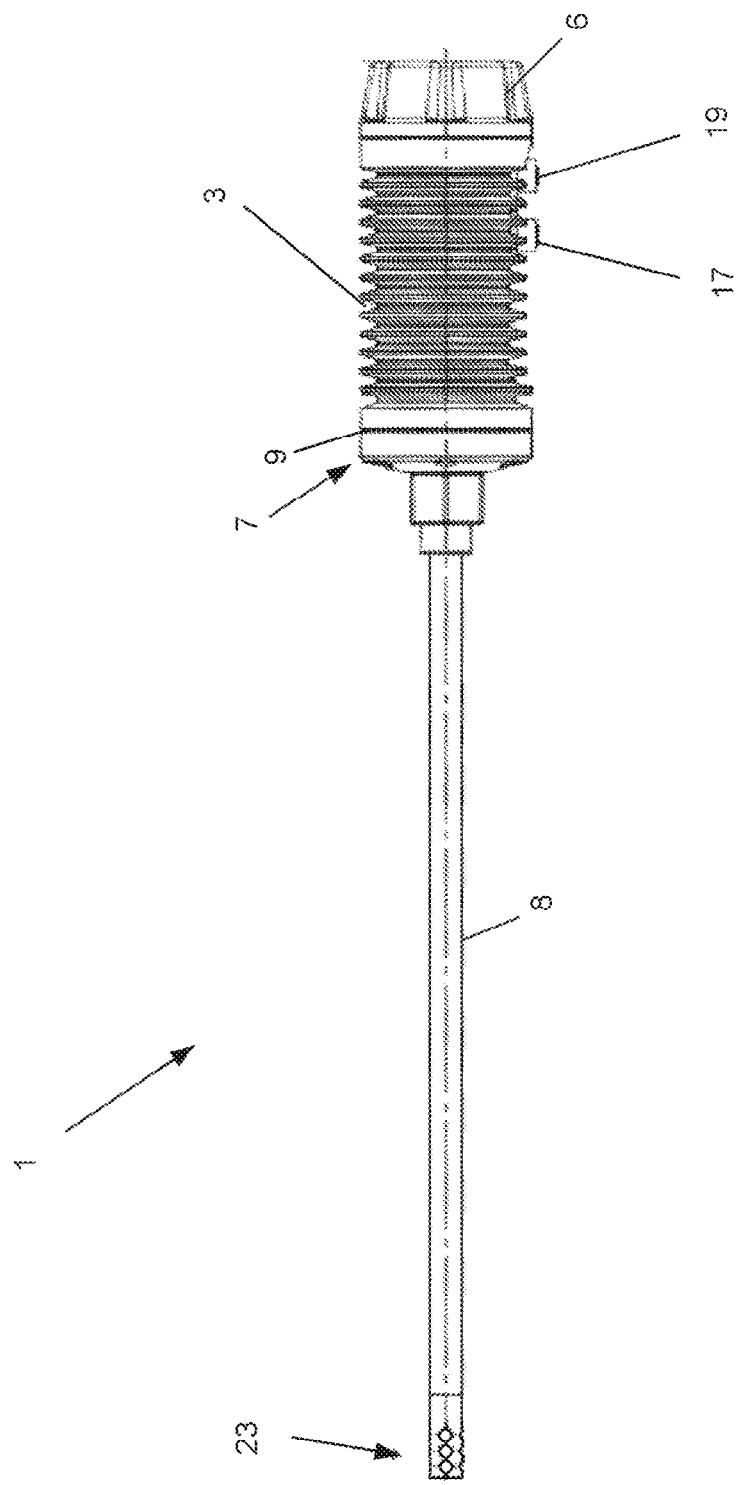
FIG. 1 is a side view of a transformer sensor according to a preferred embodiment of the present invention.
Figure 2:
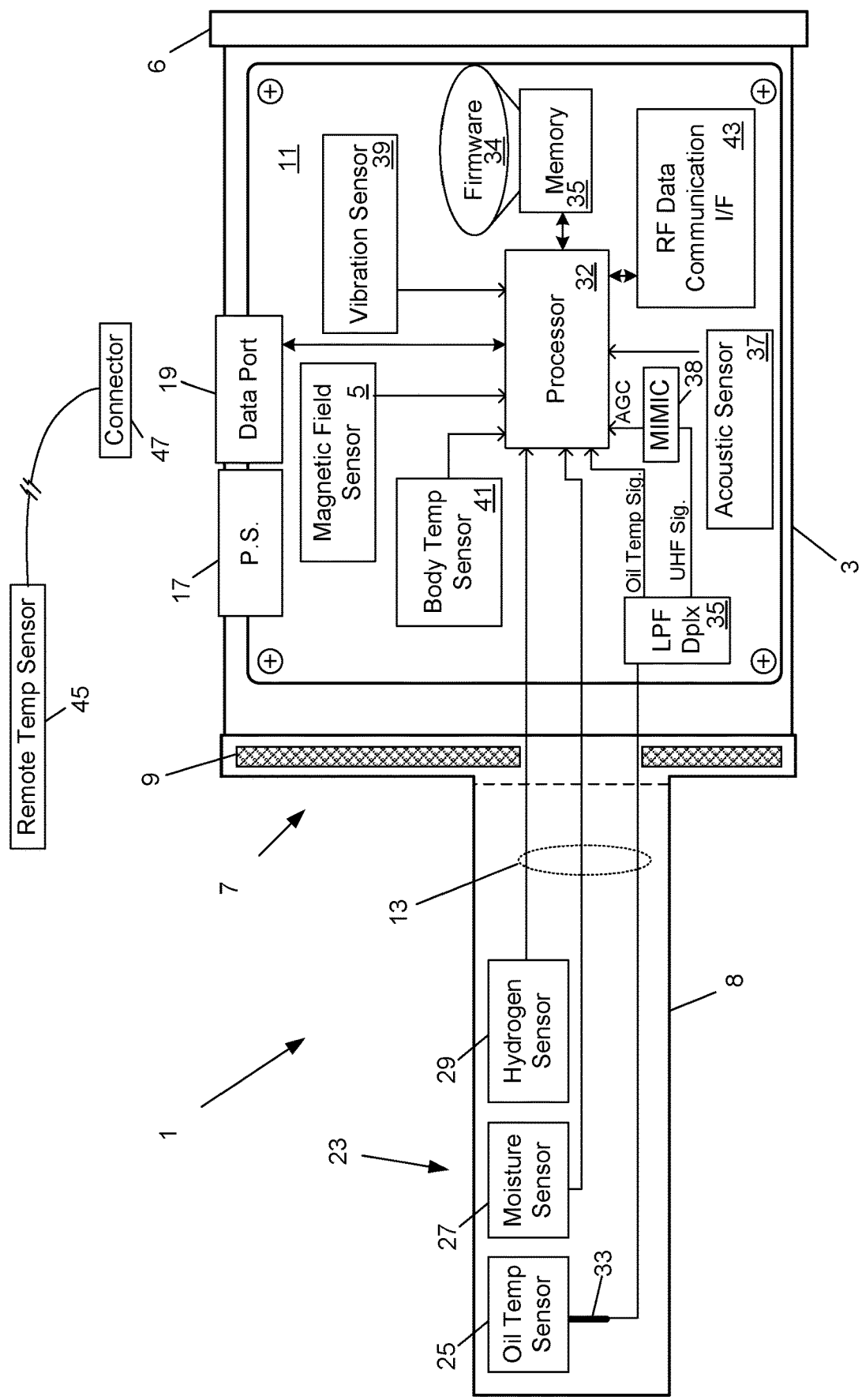
FIG. 2 is a block diagram of the transformer sensor.

FIG. 1 is a side view of a transformer sensor 1 according to a preferred embodiment of the present invention. FIG. 2 is a block diagram of the transformer sensor 1.

Figure 3:
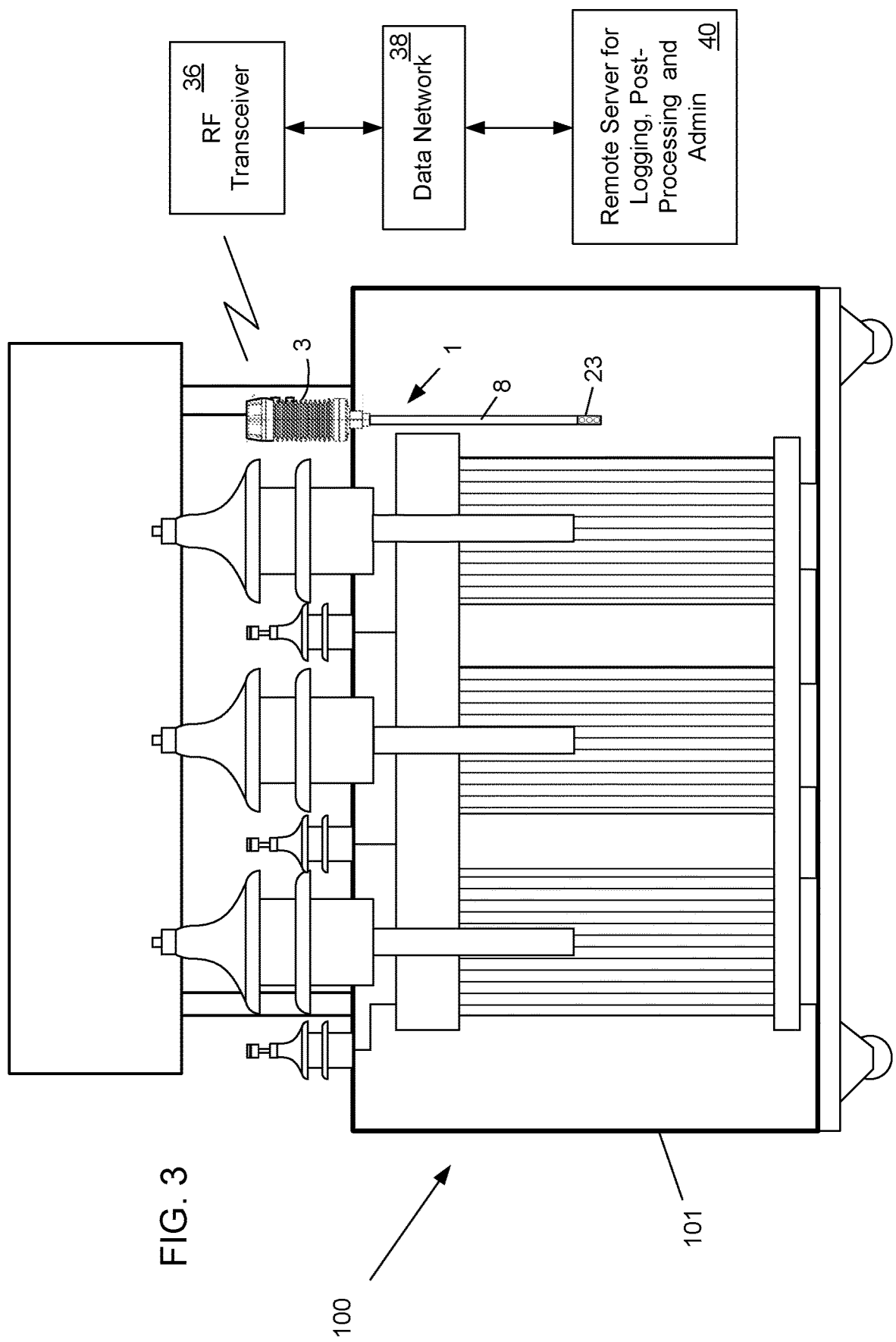
FIG. 3 is a partially cutaway side view of a transformer with the sensor installed therein wherein the sensor in communication with a remote data logging and post-processing server comprises a system for assessing an internal condition of the transformer

With reference to FIGS. 1 and 2, sensor 1 is comprised of cylindrical housing 3 that is preferably made of a of a non-magnetic metal such as aluminium and which houses an electronics assembly in the form of a loaded printed circuit board 11. Rearwardly the body 3 is capped with a plastic end cap 6, which comprises an RF transparent window, through which RF communication signals can readily pass. A coupler 7 is attached to a forward end of the body 3 and mechanically couples the body 3 to a probe in the form of a rigid tube 8, which may be made of a suitably strong, heat resistant and non-reactive material, for example stainless steel, to be immersed in the oil of an operating transformer. The coupler 7 includes a heat block in the form of a disk 9 of heat insulating material, such as a ceramic disk, to assist in preventing the flow of heat from the tube 8, to the body 3. Heat isolation is desirable because, as illustrated in FIG. 3, in use the tube 8 is located within tank 101 of a transformer 100 with the body 3 located externally of the tank. The body 3 is formed with an electric power port 17 and a data port 19 for powering the PCB 11 and programming and otherwise servicing the microprocessor 32 (equivalently referred to herein as "processor 32") that is loaded on the PCB 11.

As best seen in FIG. 2, insulated wires 13 proceed from PCB 11, through openings in the coupler 7 and ceramic disk 9 and along the inside of the stainless steel tube 8 to a number of sensors located at a remote tip 23 of the tube 8. In the presently illustrated preferred embodiment of the invention the tip located sensors are an oil temperature sensor 25, moisture in oil sensor 27, hydrogen in oil sensor 29.

The Inventor has observed that transformer partial discharge creates RF energy in the RF spectrum from 100 MHz to 2 GHz at specific locations within the 50 Hz AC excitation cycle. In this frequency range a typical receiver antenna design based on conventional ¼ wavelength antenna design principals will be in the order of 5 to 50 cm in size. However, an antenna of that size is undesirably large and inconsistent with a small low cost, easy to install design that can be retrofitted into an existing transformer, particularly where the transformer is relatively small. In order to address this problem an RF probe is provided in the form of Partial Discharge UHF antenna 33, which comprise for example a leg of one of the tip sensors or be manufactured as a stub-antenna adjacent to the other sensors. In FIG. 2 it is shown in the present case as a leg of oil temp sensor 25. There are other options for implementing the antenna such as, putting a stub off the cabling to that resistor to make an antenna or making a purpose built antenna too.

The body 3 houses PCB 11 which is loaded with a processor 32 that is configured according to instructions that it executes comprising firmware 34 stored in electronic memory 35. The processor 32 receives data (through suitable conditioning circuitry and analog-to-digital converters as are known in the prior art) from each of the previously mentioned tip sensors via wiring 13. The signals from the oil temperature sensor 25 and the partial discharge UHF antenna 33 are separated out by a Low Pass Filter (LPF) diplexer 35. A Millimeter Microwave Integrated Circuit ("MIMIC") chip is provided on the PCB 11 to monitor the UHF signal from antenna 33. The MIMIC includes an AGC circuit whose output is passed to the processor 32 for determining partial discharge levels in the transformer as will be described in more detail.

Processor 32 also receives signals from a number of sensors mounted on PCB 11, namely magnetic field sensor 5, acoustic sensor 37, vibration sensor 39 and body temperature sensor 42 which measures close to ambient temperature. The acoustic sensor 37 and the vibration sensor 39 may be one and the same, for example they may be implemented using a single accelerometer that has been designed and configured to measure vibration from the tank from sub Hertz frequencies up to audible frequencies above 1000 Hz. In a further embodiment a remote temperature sensor 45 is located outside of the body with a connector 47 that is connectable to the data connector port 19. The remote sensor may be used to measure ambient temperature. Alternatively, the ambient temperature may be calculated using the oil and body sensors by (1) Reading the difference between the transformer oil sensor and the body sensor, and (2) using this value and a calibration table to estimate the difference between body sensor and ambient. This second method is the best integrated option and provides a result that is within two degrees of actual ambient temperature.

PCB 11 is also loaded with an RF Data Communication Interface integrated circuit 43 that is coupled to the processor 32. Accordingly, the processor 32 can transmit and receive data to and from a nearby radio transceiver 36 (FIG. 3) and thence to a data network 38 for remote logging and data processing by a remote administration computer 40.

Each of the sensors that have been described with reference to FIG. 2, comprise commonly available (commercial off the shelf) sensors whose outputs are processed by the processor 32 as configured by the instructions comprising firmware 34 to monitor transformer characteristics from a number of overlapping perspectives (chemically, electrically, electromagnetically, mechanically).

The sensors used by themselves may be unsuitable, or if suitable insufficiently accurate, to assess the transformer's condition in a useful way as their output signals may be degraded by accuracy, selectivity, and noise. However, in the preferred embodiment they are combined as an integrated group of sensors and with the use of data signal processing, and correlation between sensor outputs, processor 42 is able to provide an appropriate level of detail to preferably provide five transformer assessment characteristics for effective management. In other embodiments of the invention the processor 32 does some of the processing and transmits data and/or the sensor signals to a remote server 40 which includes one or more remote processors and which may be a "cloud computing facility" to do additional and final processing. Storing the data remotely is advantageous as the processing procedures can be iteratively improved based on the stored data.

The five parameters, which are described in *Assessing Health and Criticality of Substation Transformers*, by: David J. Woodcock, Weidmann Systems International, EE Online, ELECTRIC ENERGY T&D MAGAZINE DOBLE CONFERENCE 2005 (hereby incorporated in its entirety by reference), are:

(1) Operating temperature and load volatility profile
(2) state of the paper insulation (DP, rate of change)
(3) state of the oil insulation (Break down strength, bubbling and free water risks),
(4) occurrence, rate of increase, and characteristics of partial discharge; and
(5) mechanical integrity.

The sensors depicted in FIG. 2 are typically manufactured in large scale for consumer products such as low-cost drones, consumer weather stations, personal location devices, mobile phones etc. Due to high volume manufacture they are very low cost. The Inventor has found that somewhat surprisingly, in a preferred embodiment of the invention they can be used together to produce a useful transformer condition sensor assembly.

In the preferred embodiment of the invention that is described with reference to the figures, all sensors are sampled at the same time, any correlation of signals amplitudes on multiple sensors (acoustic, electromagnetic, vibration sensors, chemical) clearly indicates partial discharge even if these signals are noisy or on their own inconclusive. If these signals occur on a transformer which has been assessed to be under high load, with aged insulation, then the transformer risk can be immediately assessed as very high (without further analysis).

Figure 4:
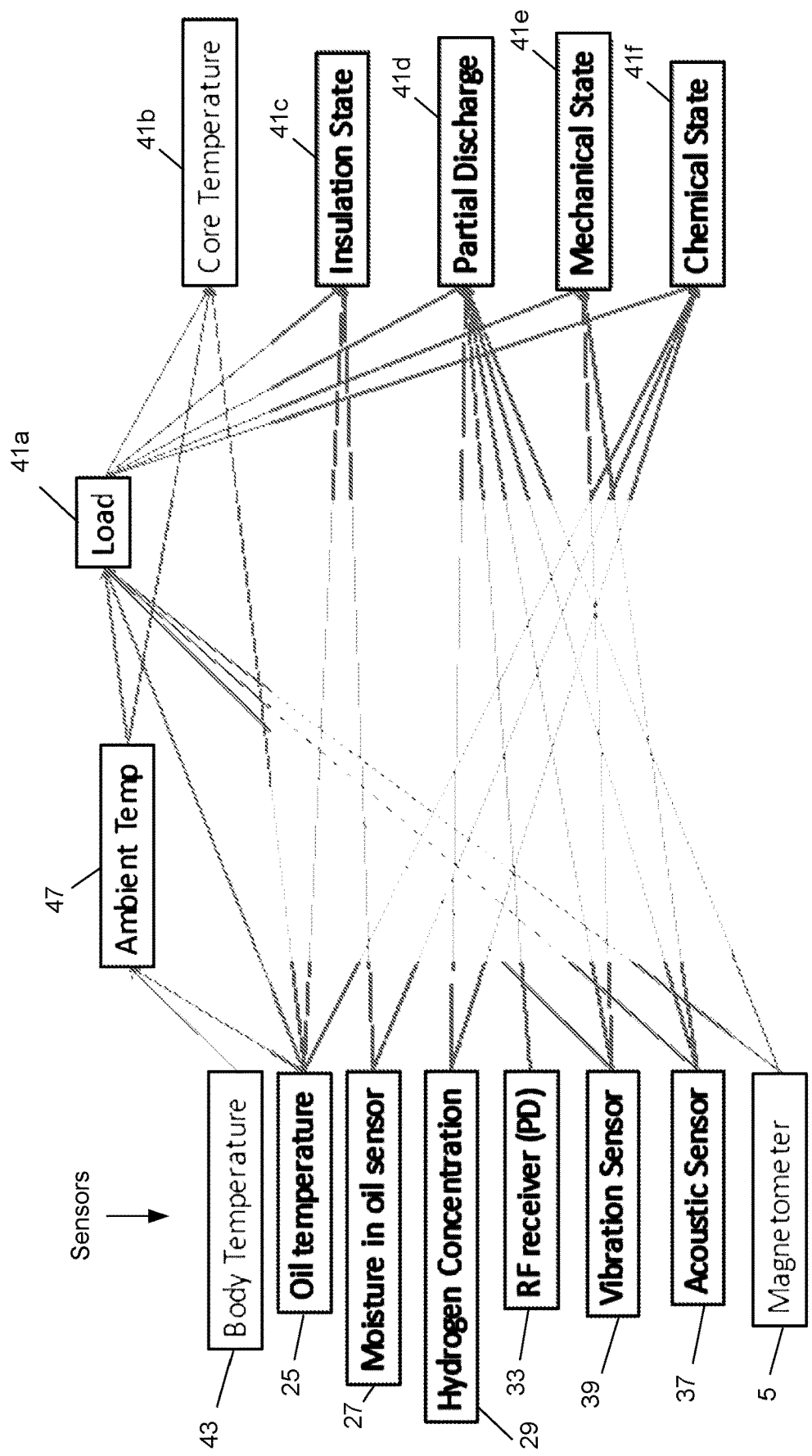
FIG. 4 is a diagram showing sensors of the transformer sensor on the left hand side and transformer condition assessment signals, indicated as items 41a, . . . , 41f, wherein the lines between the sensors and the condition assessment signals indicate the sensor output signals that are taken into account by a processor of the transformer sensor to produce the condition assessment signals.

FIG. 4 graphically illustrates six output transformer condition signals $41a, \ldots, f$ and the sensor output signals that they are based on which are processed by processor 32 in accordance with the instructions making up firmware 34 according to a preferred embodiment of the invention. Following is a description of each of the six output transformer condition signals $41a, \ldots, 41f$:

(1) Real time Transformer Load $41a$: Transformer load can be estimated by using a load model for the transformer driven from the increase in real time oil temperature signal from sensor 25 above ambient temperature and the outputs of the vibration sensor 39 (which is proportional to load but can be effected to environmental noise), acoustic sensor 37 and the magnetic field sensor 5. The difference between the oil temp and body gives the heat flux through the Heat barrier/insulator. Calibration tables give the body to ambient temp given that heat flux. The remote sensor can be located at a position on the transformer on the opposite side of the transformer radiator. That is if the oil sensor is located at the bottom of the radiator, the remote sensor can be located at the top of the radiator. If the oil temperature is located at the top a position where it measured the oil flow into the top of the radiator, the remote sensor can be located to measure the temperature at the bottom of the radiator.

The temperature data provides a clear picture of the ambient temperature, and the temperature across the radiator and from this picture an accurate understanding of the load over a period as it is very directly related to heat dissipation from the transformer which is proportional to load, and the correlated results of the other sensors (all uncorrelated signals—importantly noise and interference are removed) filling in short period diurnal changes. Calibrated with time stamped real load measurement data the combined system can provide a very accurate continuous load estimate. Furthermore, processor 32 is able to estimate relative load change of transformer 100 by monitoring an output signal from magnetic sensor 5 and the acoustic and vibration sensors.

A load change affects the amount of current flowing through transformer 100 and the amount of current contributes to induce the corresponding magnetic force and flux. The load also affects the amount of vibration and acoustic noise from the transformer as the additional magnetic fields interact with loose windings and core steal. Measuring the induced magnetic field and the acoustic and vibrations from the transformer allows the exact time of step and fast load change to be identified. Through a process of machine learning the effect of such load changes can be anticipated and predictive solutions provided. Additionally, once the output of magnetic sensor 5, and the acoustic and vibration sensors is calibrated with measured transformer current value, the absolute level of load can be obtained.

The acoustic 37 and vibration 39 sensors can be used to indicate when the fans and pumps are on as they generate their own unique vibrating frequencies which can be either directly calibrated or recognized using expert optimized machine learning.

The combination of magnetic field readings from magnetic field sensor 5 and temperature from sensors 25 and 43, calibrated with a heat versus load model for the transformer, allows the load to be monitored accurately by processor 32 as configured by firmware 34 without direct measurement of transformer input currents and voltages.

(2) Core Temperature $41b$: The temperature of the oil at the sensor location (i.e. tip 23 of probe 8) is measured directly. The important parameter for insulation state modelling is the exact temperature at the core at the hot spot. Measuring exact core temperature is not possible unless a sensor is installed at the place of interest. Considerable research has been published relating measured temperature at locations around a transformer to hot spot temperature calibrated with the state of operation of the cooling system and ambient temperature. By using the load profile as developed above, plus the oil temp sensor 25 signal, the remote temperature sensor, and ambient temp body sensor 42 signal, the processor 32 can estimate core temperature accurately using these published techniques.

Typically a transformer provides the temperature increase at rated load with the various cooling options. Therefore, the ratio of the observed temperature rise to the rated temperature rise is the percent of rated load. Either the transformer specification or a standard offset is used to calculate the hotspot temperature. A 15 degree offset is typical for most transformers at rated load. So if the transformer is running at 50% rated load then the offset from the measured top oil temperature to the hotspot is 50% of 15 degrees or 7.5 degrees. Sometime manufacturers can provide a more accurate offset as part of their delivery specification.

Figure 5:
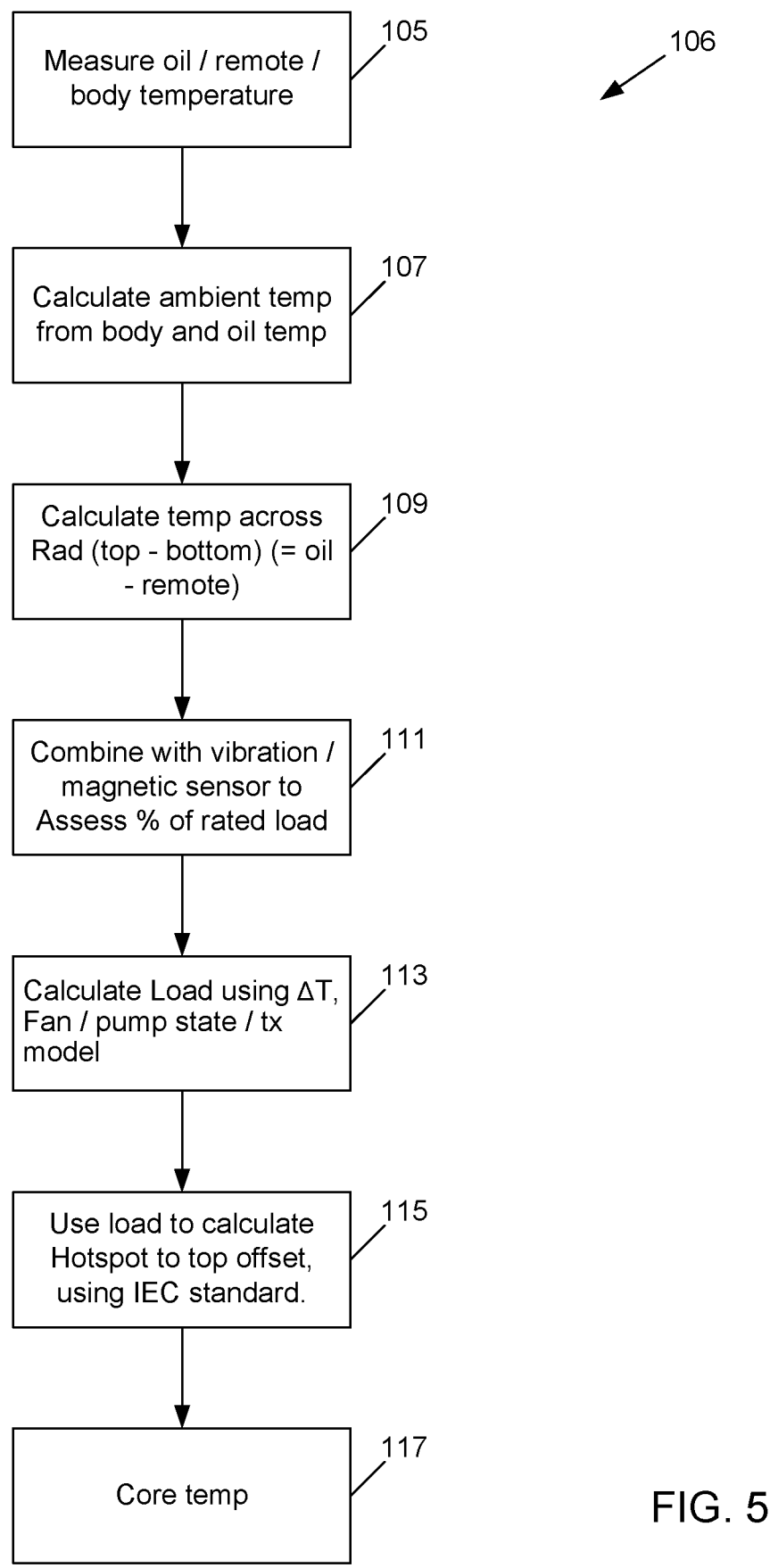
FIG. 5 is a flowchart of a method for determining core temperature of the transformer.

A preferred method for determining the core temperature is illustrated in flowchart of 106 of FIG. 5. This method is programmed as instructions that comprise firmware 34 which are stored in digital memory 35 and executed by processor 32. The method involves the processor 32 monitoring signals from the various sensors that have been discussed in relation to FIG. 2 and then processing values corresponding to those signals as set forth in the boxes 105 to 117 of flowchart 106. In relation to box 111, processor 34 confirms that measured vibration/magnetic fields are consistent with temperature across the radiator of the transformer and then uses the vibration readings to assess fan and oil pump status. At box 113 the processor calculates load using ΔT, which is the temperature difference across the radiator, Fan state reading, pump state reading and the transformer model.

(3) Insulation State 41*c*: The ageing rate of insulation paper is significantly affected by core temperature obtained from (2) and the level of available water content measured by moisture sensor 27. Considerable research has been published on the relationship between the moisture levels in the transformer oil, the temperatures of the transformer oil at the hot spot and throughout the transformer, the relationship between these parameters overtime, and the aging rate of the insulation at various key locations within the transformer. Using this research the current insulation paper's ageing condition can be estimated by the data from multiple sensors. Additionally, future ageing condition of insulation paper can be predicted from the estimated future load profile obtained from extrapolating load conditions based on the historical collection.

In addition, using a related technology the subject of PCT application PCT/AU2018/050707 developed by the present Inventor, using oil temperature, load, water activity and continuous on-line monitoring the absolute state of the insulation in terms of present depolymerisation level (DP level) may be determined.

The combination of aging and absolute age, allows the process to develop a complete understanding of the insulation condition of the transformer.

Figures 6, 7:
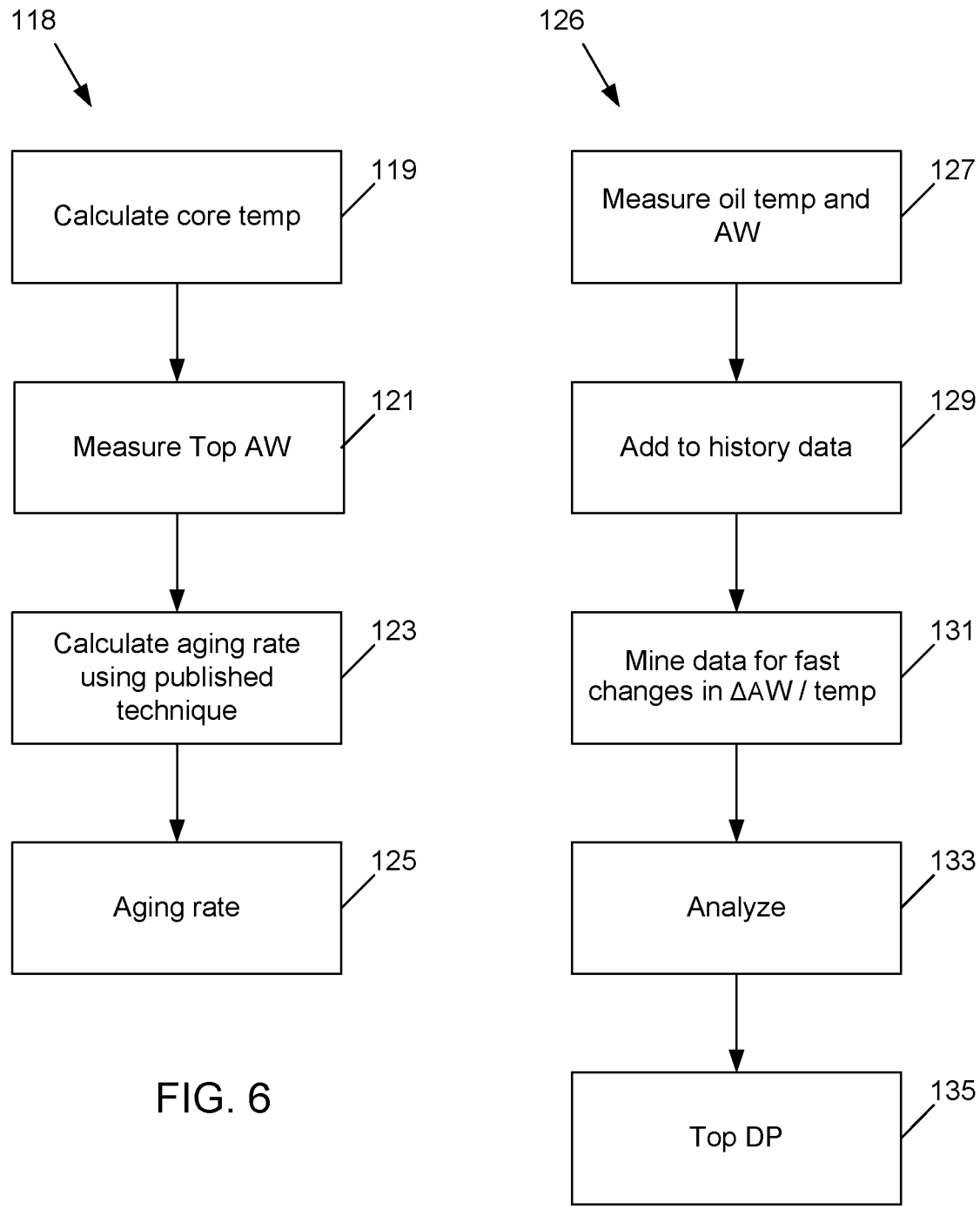
FIG. 6 is a flowchart of a method for determining aging rate of the transformer.
FIG. 7 is a flowchart of a method for determining a degree of polymerisation (DP) of the insulation of the transformer.

Flowcharts 118 of FIG. 6 and 126 of FIG. 7 are flowcharts setting out the steps for determining aging rate and Top DP as set forth in boxes 119 to 125 and boxes 127 to 135 respectively. AW in boxes 121 and 127 refers to the Water Activity as measured with moisture sensor 27.

Top DP in box 135 refers to the calculated degree of polymerisation of the insulation at the top of the transformer which is determined at box 133 using the methods set out in PCT/AU2018/050707, the disclosure of which is hereby incorporated in its entirety by reference. ΔAW in box 131 refers to the change in moisture activity (AW) per degree of temperature. The word "Top" refers to the location in the transformer for which the DP is determined, i.e. at or close to the top of the tank. A Top DP value can be measured directly if the sensor is located at the top of the transformer calculated from the measurement of the water activity at another location (e.g. the bottom of the transformer), using published research. The calculation for doing so is based on change in temperature between the measured location and the desired location.

(4) Partial Discharge 41*d*: The processor 32 as configured by firmware 34 is able to monitor levels of partial discharge using the UHF sensor 33, correlated with the hydrogen sensor 29 signal and signals from the acoustic sensor 37 and vibration sensor 39, all correlated to the transformer excitation voltages and current measured using the magnetic sensor 5. In the preferred embodiment of the invention a short stub or probe antenna 33 is implemented using the leg of any one of the existing sensors in the probe end (moisture, Hydrogen, or temperature). The temperature sensor 25 is the preferred location. The output from the temperature sensor 25 is driven by a signal of frequency<100 Hz so that the UHF signal multiplexes onto this connection and can be subsequently demuxed out using a conventional low pass/high pass filter diplexer 35 being a diplexer that has a low pass filter for one port and a high pass filter for the other. Being the leg of the temperature sensor, the antenna 33 has very low gain, however being integrated into the sensor tip 33 and therefore located within the transformer tank 101 (which is essentially an anechoic chamber and therefore insulated from artificial/industrial interference from radio transmissions), such low gain can be compensated with additional receiver gain by MIMIC 38. As will be discussed, the PD signal can still be detected by processor 32 by monitoring an AGC signal from the MIMIC as long as the partial discharge RF strength is above thermal noise. If the noise is correctly correlated with the 50 Hz excitation cycle of the transformer supply voltage, then a clear PD determination can be made. Such an approach would not be possible if the antenna was located outside the tank as is conventional practice where there is considerable artificial/industrial noise (that is a high interfering noise floor).

The Inventor has recognized that wide band RF receiver circuitry is complicated and expensive and therefore incompatible with the low-cost objective of the design. However, there are commercially available low cost short range transceiver Microwave and Millimeter Wave Monolithic Integrated Circuits (MIMIC) MIMIC's on the market for such products are zigbee and Bluetooth. These products are specifically designed as single chip transceiver solutions. Internally they have an LNA (Low noise receiver amplifier), down converter and automatic gain control (AGC) but are typically highly optimized for a specific data communication purpose. In the preferred embodiment of the present invention a MIMIC chip 36 has been re-purposed to provide impulsive noise floor information in a specific band by reading, with processor 32, its internal AGC (automatic gain control) signal at high speed. Typically, the AGC within the chips is used to automatically adjust the receiver levels to prevent saturation during each packet reception and therefore error free data reception. However, in the absence of a receive signal, the AGC will adjust the level at the receiver input proportional to the noise floor. If the AGC circuit has suitable bandwidth, then the Inventor has realised it will reflect the noise envelop including that caused by individual partial discharges within the transformer. Importantly this will only work as long as there are no other interferers. As the receiver antenna 33 is inside the transformer tank 101 during use, there will be no interfering RF signal. Simple high speed samplings of the AGC level of MIMC 38 allow sensor 1 to provide a low-cost impulse noise receiver functionality.

The location of PD on the excitation waveform from the receiver antenna 33 contains information regarding the type of PD that is occurring. The severity of the PD is proportional to the magnitude and the amount of PD (for example the amount of waveform it covers and how often it occurs).

PD activity and level changes can be monitored through the total energy of PD emission over a fixed period or through discharge correlation with the excitation voltages. PD monitoring through correlation with excitation voltages is particularly accurate and provides a 100% level of certainty. The magnetic sensor provides the excitation signal frequency and phase. Correlating the PD signal with the excitation voltages therefore improves measurement confidence that the signal is PD of very specific type (voltage dependent, impulsive or sustained over the waveform) and not random or unusual noise.

Additionally, hydrogen sensor 29 can be used by the processor to monitor a change in hydrogen gas concentration level and thus processor 32 can detect a trend of PD activity over time and correlated with the RF DP sensor raise an alert to very serious conditions such as high and growing PD activity which can lead to catastrophic breakdown or dangerously concentrations of explosive gas.

It is routine for the transformer owner to take oil samples and have them analysed in a laboratory for all critical gasses including Hydrogen (Hydrogen being the most common volatile gas produced). This process is done a maximum each year and sometime even 2, 3 or more years. Comparing the most recent oil sample measurement of hydrogen with the continuous measurement produced by the sensor allows the other gasses to be extrapolated between the oil test period. If growth in Hydrogen gas occurs, this can indicate an increase in discharge activity and therefore a corresponding prediction of the other critical gasses can be made especially with correlating information on the type and location of the PD driving the increase. This allows visibility and some predictive capability for the other gasses and anticipation of critical failure modes.

Figure 8:
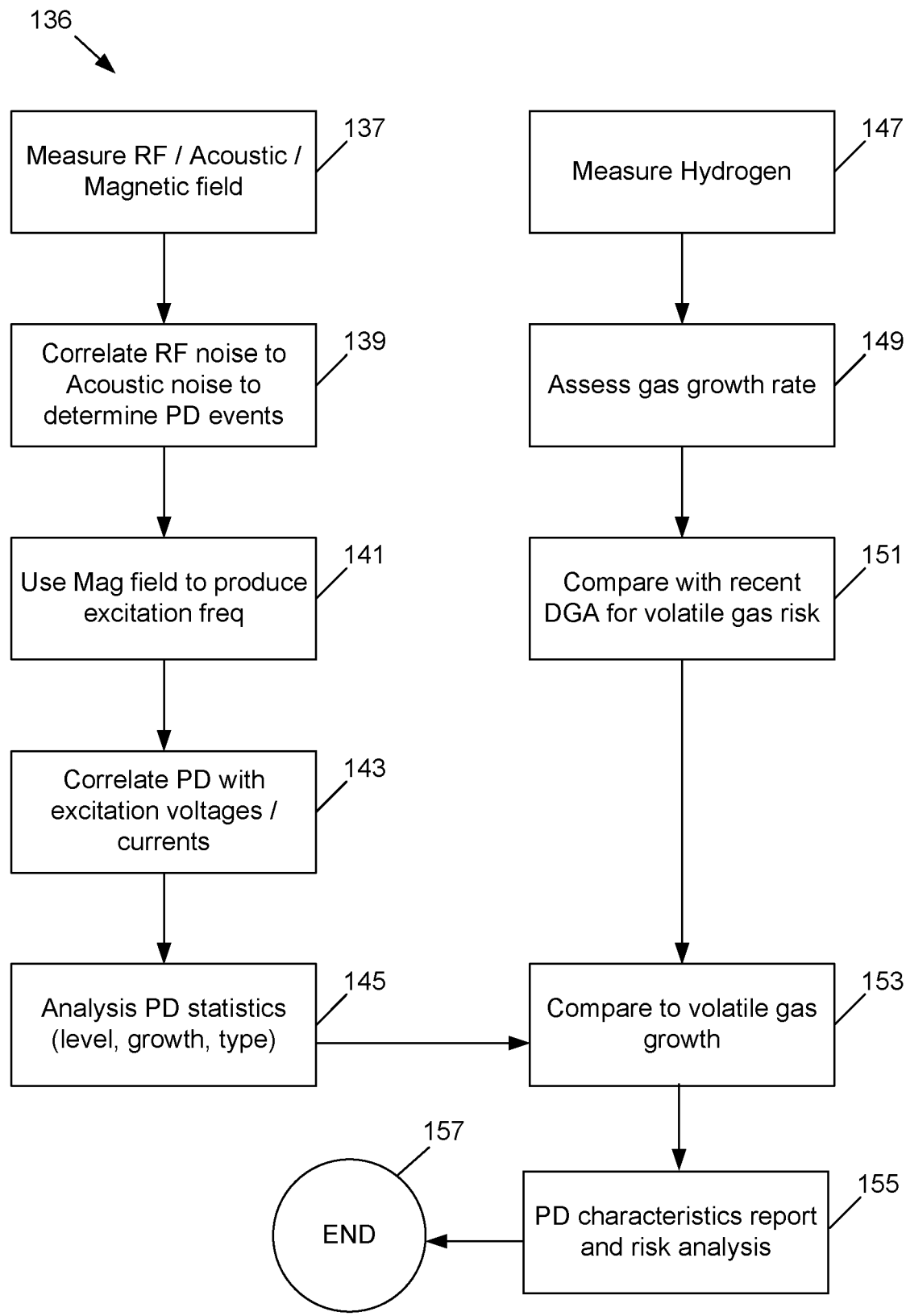
FIG. 8 is a flowchart of a method for determining partial discharge (PD) characteristics of the transformer.

Flowchart 136 of FIG. 8 sets out the steps for determining Partial Discharge (PD) as set forth in boxes 137 to 155.

(5) Mechanical State 41e: Over the life of a transformer minor faults within a transformer can become major problems such as winding breakage and insulation destruction due to vibration and progressive mechanical wear. Such problems begin as small unimportant vibrations as a result of the vast magnetic and electric fields within the transformers. These vast fields cause distortion on the metal components in proportion to the fields magnitude. Small manufacturing tolerance variations at start of life can be the focus of early vibration which over time progressively develop into significant problems. Further significant mechanical distortions can be induced during the transport of a transformer, or caused by large transient current surges such as lightning or short circuit events, or by age-induced clamping pressure loss due to moisture caused insulation swelling or constant load cycling at any time.

In addition the mechanical parts axillary systems within a transformer especially the on-load tap changer (OLTP) have very well understood vibration signatures. When a tap changer moves taps there is direct mechanical noise associated with the movement of the mechanism as well as acoustic noise associated with the unavoidable electrical arcing as the load current is moved from one transformer tap to the next.

As the transformer moves through life the vibration and acoustic noise invariably develops with age as the mechanical integrity of the total transformer structure and auxiliary components degrades with use and time.

Over the life a transformer either as a result of manufacturing problems or aging, metallic parts within the transformer may become isolated from ground (the tank). If this occurs where there is high magnetic fields corona discharge may begin around sharp edges which produce a low energy partial discharge noise plus and hydrogen gas. This mechanical degradation can be confirmed if it occurs without any signs of additional volatile gasses (such as Methane or Acetylene).

The vast majority of moisture which accumulates within a transformer over life actually results from absorption from the environment rather than internal generation. It is estimated that if a transformer could be completely sealed from atmospheric moisture over life it would generate no much more than 1.5% by weight of moisture. Levels above 5% are common in very old transformers. The typical method of moisture ingress is through broken seals. During periods of hot weather or high load pressure builds up within the transformer. Usually the transformer vents this pressure for safety reasons (either through a pressure release or through the tank seals). If then the transformer is exposed to a change in environmental conditions (like rain), the transformer will quickly cool, the internal pressure will fall below that of atmospheric pressure. If any seals are compromised, air will be drawn into the transformer. If the seals are wet, the moisture on the seals will be drawn in as the pressure equalises.

Monitoring moisture in the transformer continuously over full temperature cycles allows an accurate picture of the total moisture within the transformer in terms of Water content of the paper (where 99% of the moisture resides). If monitoring observes fast increase of moisture levels, especially as a result of fast temperature changes, a clear indication of compromised seals within the transformer can be determined. Remedial maintenance may then be instigated before large amounts of moisture enters the transformer significantly reducing life.

Using the AW ("Average Water") and temperature measurements, the water content of the paper in the insulation of the transformer is estimated using the standard developed technique. Within a transformer the vast majority of the water in a transformer is captured in the paper insulation. Therefore, growth in the average water content of paper must be due to an increase in the total water content in the transformer. The process of aging of the paper generates some moisture and the amount of such increase is a well understood and studied process. Therefore, if the increase is above that which is expected due to aging, the moisture must have come in from the environment.

The typical method of moisture ingress into a transformer is (1) In free breathing transformers due to a lack of maintenance to the inlet-air drying system or (2) due to leaking tank seals (3) or both. Therefore, dependent on the transformer type excessive moisture ingress is a critical mechanical state indicator and can be used to diagnose the need for site maintenance (dryer maintenance) or poor mechanical state of the transformer tank.

Water will enter a poorly maintained transformer through the seals during specific climatic events. The best example is if the ambient temperature drops quickly with the passage of a cold front. Before the cold front the temperature is hot and there is likely to be a large air-conditioning load. After the passage, the air temp is much cooler and often the load drops because the air-conditioner demand has fallen away. Often the transformer is very hot before the passage of the front and cools quickly after passage. This can cause a negative internal pressure within the transformer and if the passage is associated with rain, moisture is pulled into the transformer past leaking or aged gaskets and seal.

If a fast increase in water activity occurs after a fast fall in ambient temperature, or the total water content of the transformer grows quickly after a similar fall, then leaky gaskets and seals can be confidently identified as the problem. Searching the ambient record for such changes can identify with some confidence the maintenance issue and the time of ingress.

Hydrogen is the easiest gas produced within a transformer. It can be produced as part of partial discharge (with other gasses), through corona as a result of poor internal grounding within the transformer (or broken grounds and corrosion), or through chemical reaction with certain metals (usually as a result of poor quality control during manufacturing).

If Hydrogen gas is growing without any evidence of serious partial discharge it is likely to be as a result corona from earthing problems in the transformer (is there is low level continuous RF noise but not impulsive discharges type noise) or through chemical action (if there is no electrical noise in the PD bands at all).

Processor 32 as configured by firmware 34 is able to monitor the mechanical condition of the transformer using output signals from the vibration sensor 39 and the acoustic sensor 37 in combination with signals from the magnetic sensor 5, the hydrogen signal, the PD signal, the water activity signal and a load model. Correlating load with acoustic and vibration signals and these signals over time with age is a powerful method of assessing the progressive aging of a transformer especially when such progression is finger-printed against vibration and acoustic signatures of new and/or benchmarked with similarly aged populations of similar transformer types.

The types of problems that can be diagnosed include core winding damage or loss of clamping pressure from age when the vibration and noise is correlated with load and dominated by 50 Hz harmonics, cooling system related (when wide band and not 50 Hz harmonics dominated but still related to high ambient temperature or load), or auxiliary system problems when sporadic and wide band (tap change noise, tap hunting etc.).

Correlating PD and hydrogen levels with oil test results is a power method to monitor structure degradation in the form of isolated parts. Monitoring total moisture within the transformer a power method to help minimize moisture ingress and the total life of the transformer.

Processor 32 as configured by firmware 34 is able to track the progressive development of vibrations and acoustic noise from the transformer and correlate that noise with load, absolute temperature and ambient temperature changes. Using frequency analysis (Fourier transform analysis) it can separate magnetic field driven vibration (which is proportional to magnitude and therefore twice the operating frequency) from other types of vibration which are proportional to the fundamental operating frequency. Using models developed and downloaded through remote processing of large numbers of similar transformers it can also fingerprint the relative age of the transformer as a member of the larger populations of similar transformers.

Figure 9:
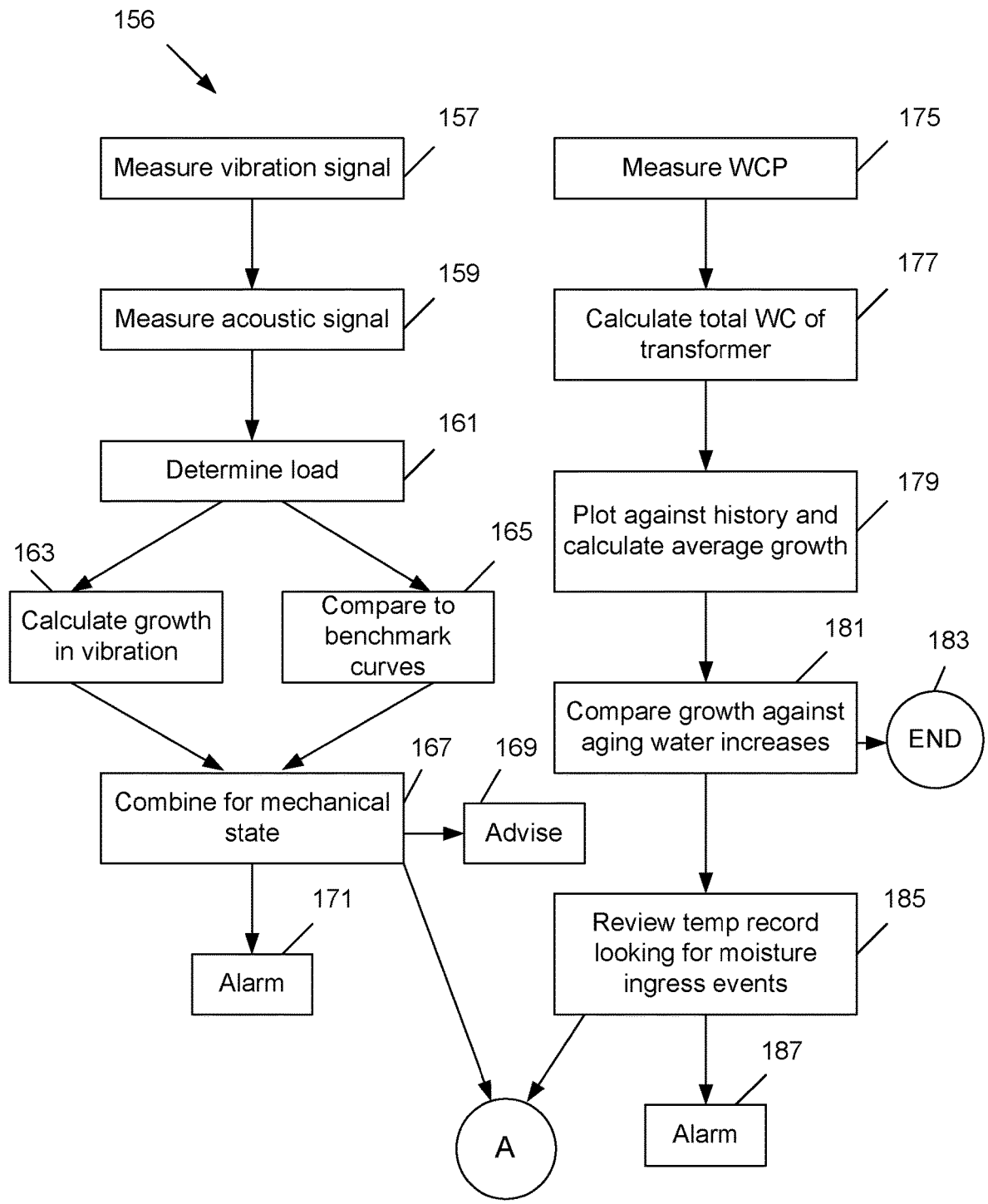
FIG. 9 is a first part of a flowchart of a method for determining a mechanical condition rating for the transformer.
Figure 10:
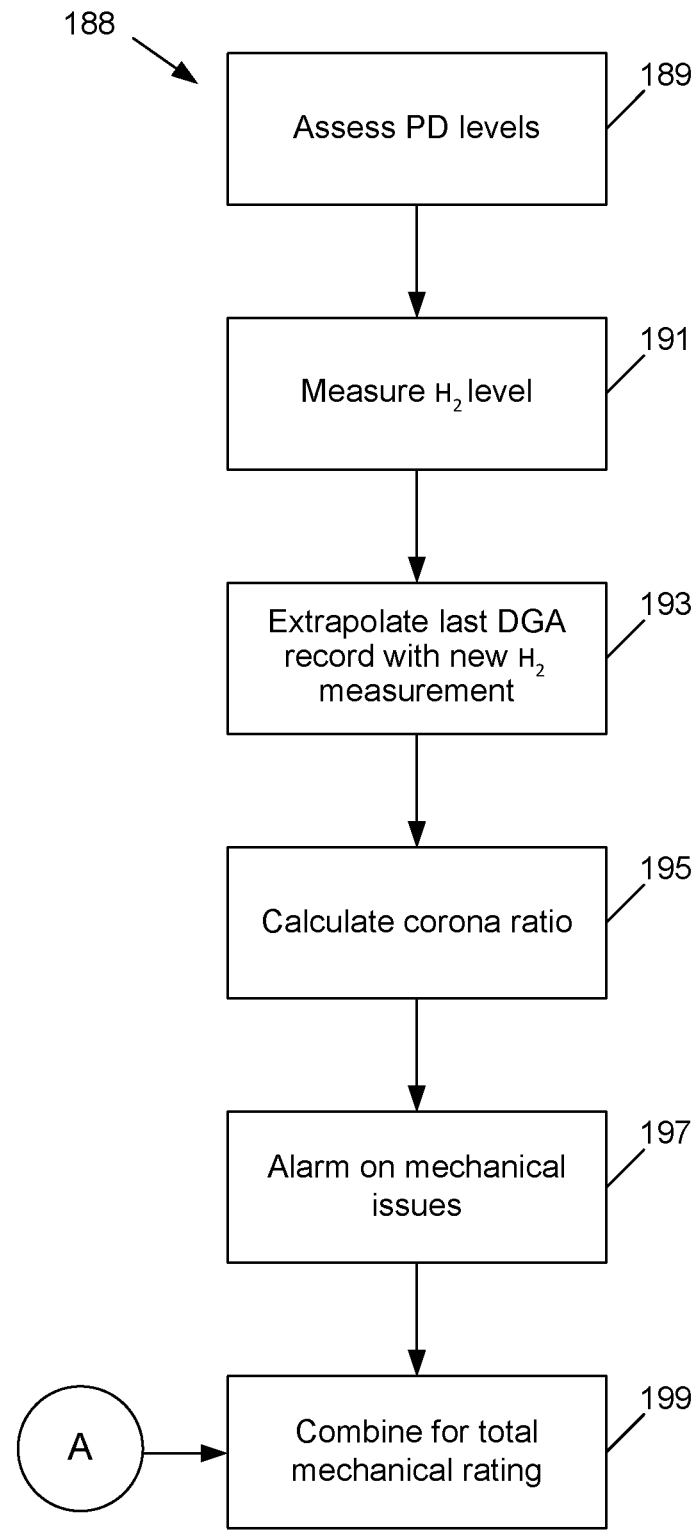
FIG. 10 is a second part of the flowchart of the method for determining the mechanical condition rating of the transformer.

Flowchart branches 156 of FIG. 9 and 188 of FIG. 10 describe procedures for producing a rating reflecting the mechanical condition of the transformer by means of procedures set forth in each of boxes 157 to 199. At boxes 171 and 187 the processor 34 raises an alarm if the mechanical state is assessed to be dangerous or if ingress events are occurring. Finally at box 199 the processor produces a combined total mechanical rating taking into account PD levels (box 189), vibration and acoustic sensor measurements (boxes 157, 159) and measured Water Content (Box 175).

(6) Oil State 41*f*: The state of the oil in tank 101 can be assessed by processor 32 as configured by firmware 34 based on signals from the hydrogen sensor 29 and the moisture in oil sensor 27 calibrated with temperature sensor data.

The chemical state of the oil in a transformer is critical to maintaining total insulation breakdown strength. The paper insulation within a transformer provides important structural separation between electrical components, it is however the oil in the transformer (soaked into the paper or circulating between winding elements) that provides the electrical insulation and the maintenance of the dielectric breakdown strength of the oil is critical to continuing safe operation.

Figure 12:
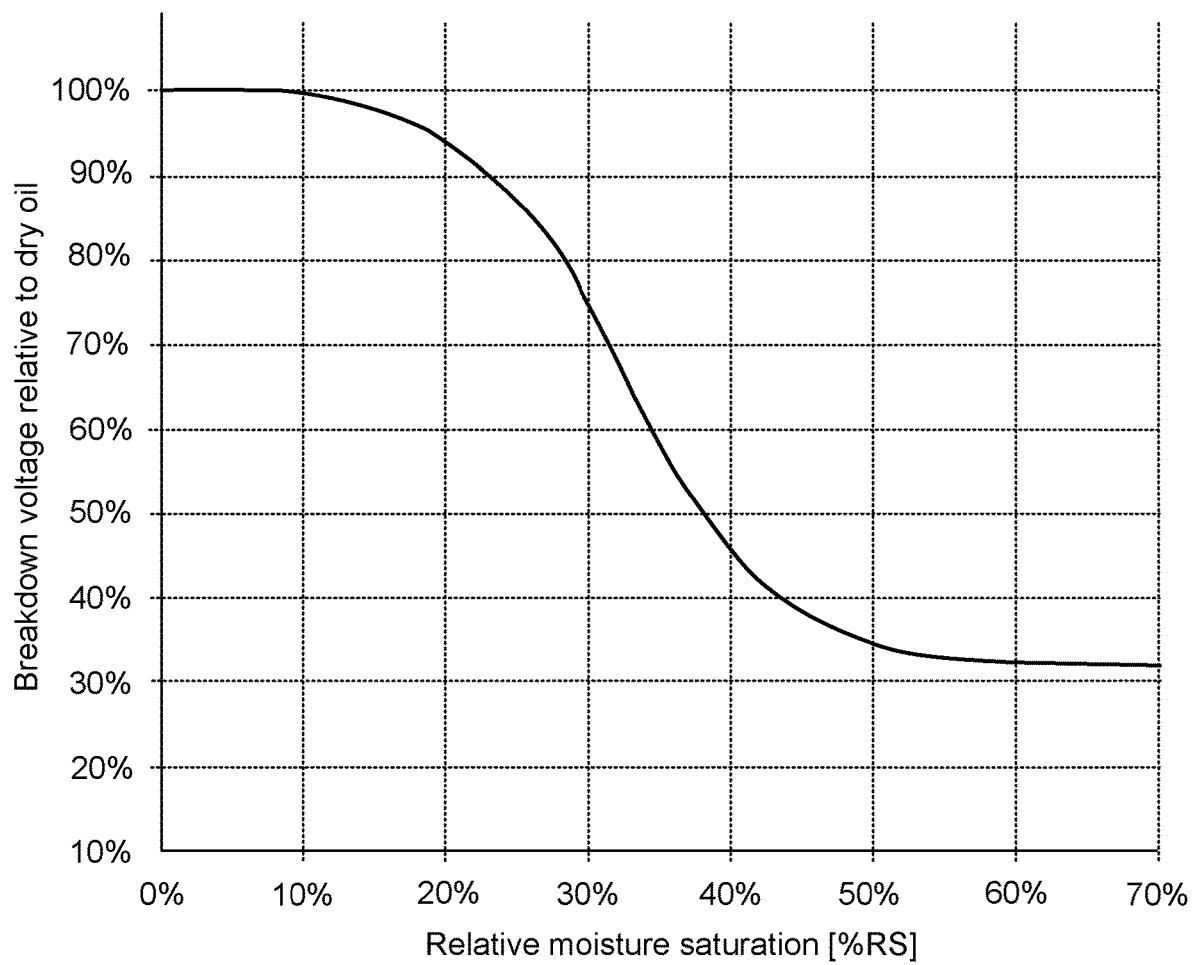
FIG. 12 is a graph showing a characteristic curve relating breakdown voltage of a transformer to relative moisture saturation.

The dielectric breakdown strength of the oil in a transformer is effected by deposits and impurities in the oil (as a result of chemical breakdown of the oil or paper) and even more importantly the moisture levels. High levels of moisture in the oil can suppress breakdown strength by up to 80%. The relationship is shown in FIG. 12. Tracking the moisture activity (AW) over time allows the worst case events of moisture levels in the oil to be detected. This can be reported as an indication of oil state. By continuously monitoring the WA (water activity/humidity) and the temperature it is possible to calculate the WCP within the insulation. Using this estimate, the effect of the paper can be removed from the observed instantaneous values of wa/temp. The error is associated with the solubility of the moisture in the oil. Solubility of different types of transformer oil with age is a well-studied process. Using this relationship an estimate of the age of the oil can be made from the solubility.

Moisture movement in a transformer is a highly dynamic process. During heating periods (load increase) moisture is driven out of the hotter sections of the transformer insulation, and through the corresponding increase in saturation of the oil, slowly deposited into cold sections. During cooling cycles the reverse occurs. The rate of moisture movement in/out of the paper and oil is very dependent on temperature and is a far slower process than the temperature/load changes. As a result, depending on the transformers operating history, the oil moisture levels can be high, or low even though at the time of the sample the transformer seemed on the outside to be in a common operating state.

Dissolved Gas Analysis (DGA) is the most common widely used technique for transformer condition monitoring. The accuracy of Dissolved Gas Analysis (DGA) (a process of sampling transformer oil and laboratory testing for chemical properties including breakdown strength) is highly compromised in practice by inappropriately collected oil samples especially when oil temperature is unreliably recorded, the sample is inappropriately taken of stored for transport to the testing laboratory or the sample is mishandled or badly labelled prior to laboratory testing. The result is very poor correlation over time of DGA results and transformer state or age estimation. In particular, incorrect recording of the oil temperature at the time of the sample is the most significant form of error. Improved performance of this testing of the chemical state of the transformer oil is possible by correcting and correlating sample time with online data including hydrogen gas concentration levels, water activity and temperature measurements. Based on the sensors' data (hydrogen gas, water activity and temperature), DGA results can be corrected making them far more accurate.

Further oil sampling can only assess the state of the oil at a specific moments of time. Without an understanding of the load history of the transformer prior to the sample, the accuracy of moisture results is poor. Correlating DGA sample time with online collected historical data allows the previous operating state of the transformer to be taken into account and an accurate picture of the true oil moisture levels and chemical state.

Further continuous monitoring of oil moisture correlated with load allows processor 32 to generate a detailed picture of the worse-case moisture saturation of the oil over time relating to oil breakdown strength, bubbling temperature (the temperature that water droplets form on the surface of the insulation during fast temperature rise and very high loads), and water droplet formation.

Figure 11:
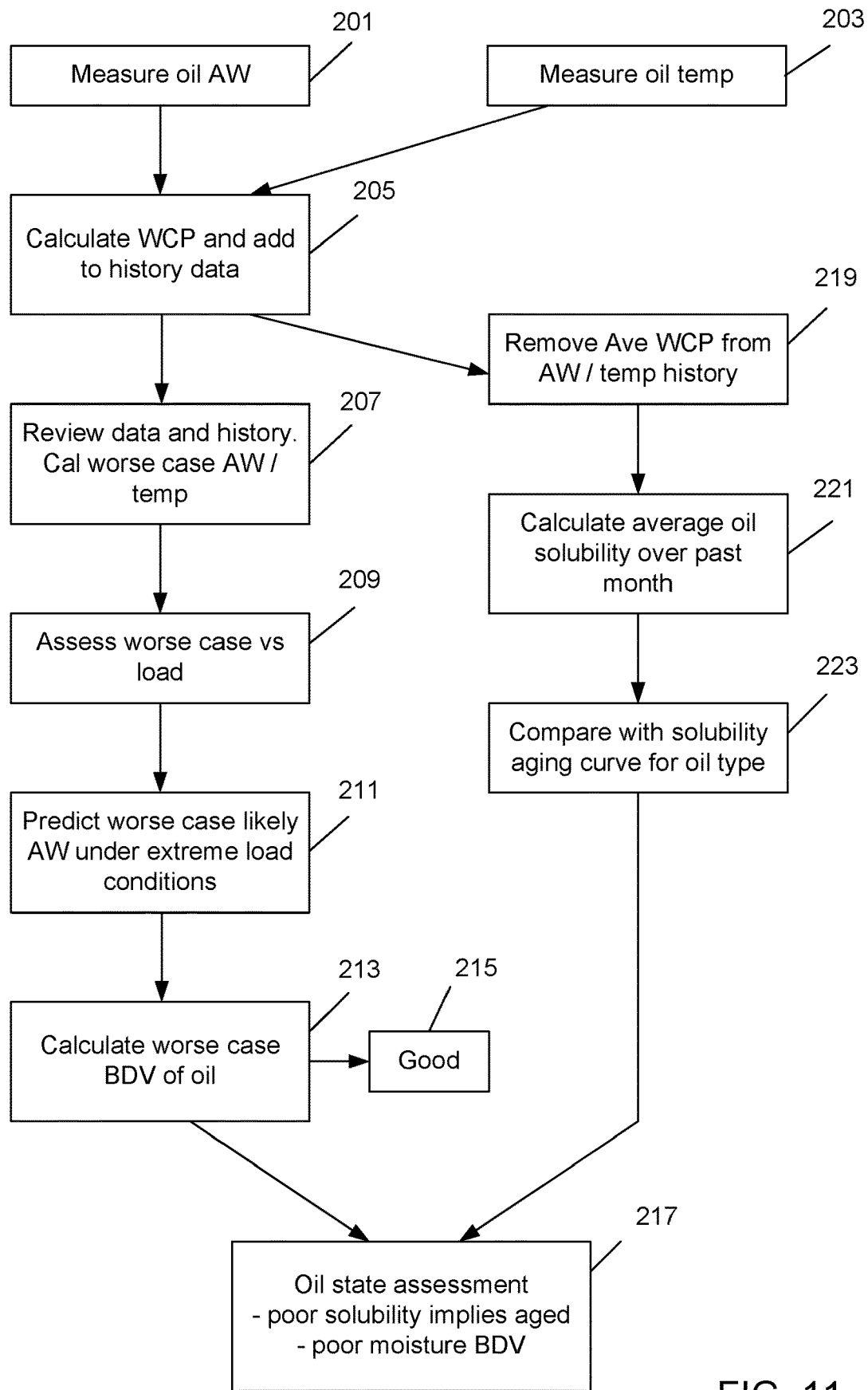
FIG. 11 is a flowchart of a method for assessing oil state of the transformer.

Flowchart 200 of FIG. 11 sets out procedures, in boxes 201 to 217 for a method to assess the state of the oil in the transformer tank which may be carried out by an electronic processor provided with data from the sensors of FIG. 2.

In order for sensor 1 to measure transformer oil temperature, ambient temperature, and vibration and coupled acoustics in one low cost unit, a heat block in the form of thermal insulation interface 9, which may comprise a ceramic disk, has been employed to separate the probe end, i.e. tip 23 (inside the tank 101 where the oil and transformer temperature sensor is) thermally, but not mechanically, from the sensor body where the ambient body temperature sensor 43 is located. The thermal barrier provided by ceramic disk 9 is designed to prevent the body 3 from significant temperature rise (even when the transformer 100 is very hot) while still maintaining a suitable low loss mechanical connection for vibration and coupled acoustic signal for detection by the acoustic sensor 37 and vibration sensor 39, which are located in the body. Calibration tables can be stored in memory 35 and used to calculate true ambient temperature from a measurement of the body temperature, a second measurement of the oil sensor temperature, the thermal resistance of the joint, and the thermal resistance of the body to ambient air.

As previously mentioned, in order to allow the transformer sensor 1 to measure magnetic fields, care has been made to ensure the entire unit is manufactured from non-magnetic metals and materials such as stainless steel for the sensor tube 8, extruded aluminium for the body 3 and plastic. The preferred embodiment of the invention that is illustrated in FIG. 1 has a probe 8 with a length of 400 mmm and a diameter of 14 mm. The overall length of the transformer assembly, including the length of the probe and of the body is 594 mm. It will be realized that these dimensions are provided for illustrative purposes only and are not limiting as longer or shorter dimensions might be used depending on the intended transformer to be monitored.

In use the probe 8 is inserted through an aperture of the tank 101 of the transformer 100, such as an oil filler or drain hole and a suitable surround is used to seal about the probe. The body 3 remains on the outside of the tank as illustrated in FIG. 3. Electrical power is connected to the probe via power supply port 17. For example, the body 3 may include a battery that is recharged by a solar power connection to port 17 depending on the location of the transformer and seasonal sunlight availability. The RF Data Communication Interface 41 establishes wireless data communication with the remote RF transceiver 36, which will typically be located within a few meters from transformer sensor 1 but could equally make use of the public communications infrastructure, for example data network 38 of FIG. 3 may comprise the Internet, and thus the remote server 40 may be located many kilometres from sensor 1. After initialization the processor 32 repeatedly samples data signals from the probe sensors and body sensors and takes into account correlation from the sampled signals in order to process them and generate the output signals indicating the five previously discussed transformer health conditions which are then passed to the RF data communication I/F 41 for transmittal to the remote logging and administration server 40 via data network 38. Maintenance, deactivation and replacement of transformers detected to be operating dangerously can then be undertaken.

The sensor assembly 1 may be provided in combination with the remote server 40 so that depending on the processing power of the remote server 40 and of the processor 32 the bulk, or all, of the processing to determine the transformer condition, may be done at either the processor 32 or at the remote server 40.

In some embodiments the processor 32 collects data, i.e. signals from the sensors and does basic processing before passing it to the RF data communications I/F 41 for transmittal to the remote processing server 40 for the completion of the processing to generate values for the one or more of the five previously discussed transformer health conditions. Accordingly, many or all of the procedures set forth in the boxes of the flowcharts of FIGS. 5 to 11 may be performed by one or more remote processors being processors of remotely located server 40.

In compliance with the statute, the invention has been described in language more or less specific to structural or methodical features. The term "comprises" and its variations, such as "comprising" and "comprised of" is used throughout in an inclusive sense and not to the exclusion of any additional features.

It is to be understood that the invention is not limited to specific features shown or described since the means herein described comprises preferred forms of putting the invention into effect.

The invention is, therefore, claimed in any of its forms or modifications within the proper scope of the appended claims appropriately interpreted by those skilled in the art.

The invention claimed is:

1. A sensor assembly for monitoring an internal condition of a transformer comprising:
a body for location outside a tank of the transformer, the body housing an electronics assembly including body sensors coupled to a processor;
a probe including an elongate tube extending from the body for insertion into a tank of the transformer;
a plurality of probe sensors coupled to the processor disposed at or toward a remote end of the elongate tube for sensing conditions within the tank;
wherein the processor is configured to process signals from the probe sensors and the body sensors to produce signals for assessing one or more of: transformer core temperature; transformer insulation state; partial discharge; mechanical state of transformer; chemical state of transformer,
wherein one of the probe sensors comprises a radio-frequency antenna for sensing electromagnetic (EM) radiation due to partial discharges during operation of the transformer, said antenna having an electrically short antenna of length less than ¼ of a wavelength of the EM radiation wherein the processor is configured to produce signals indicating presence of a partial discharge taking into account a signal from the antenna.

2. An assembly according to claim 1, wherein one of the probe sensors comprises an oil temperature sensor for measuring a temperature of oil in the tank, and one of the body sensors comprises a body temperature sensor for measuring a temperature of the body.

3. An assembly according to claim 2, in combination with a remote server, wherein the processor and/or the remote server are configured to determine a transformer load condition taking into account signals from the oil temperature sensor and the body temperature sensor.

4. A combination according to claim 3, wherein the assembly includes a remote temperature sensor for sensing a temperature at a location on the transformer tank and wherein the processor and/or the remote server are configured to determine the transformer load condition further taking into account a signal from the remote temperature sensor.

5. A combination according to claim 4, wherein the body sensors include at least one of a vibration sensor and an acoustic sensor, and wherein the processor and/or the remote server are configured to further take into account signals from the vibration sensor and/or the acoustic sensor for determining the transformer load condition.

6. A combination according to claim 5, wherein the body sensors include a magnetic field sensor, and wherein the processor and/or the server is configured to:
    determine the load of the transformer taking into account signals from the magnetic field sensor; and/or
    calibrate signals from the magnetic field sensor with a measured transformer current value for determining an absolute load of the transformer; and/or
    produce signals indicating mechanical conditions including one or more of: core winding damage; loss of clamping pressure; and transformer tap malfunction such as excessive tap change noise and tap hunting.

7. An assembly according to claim 1, in combination with a remote temperature sensor for sensing a temperature at a location on the transformer tank.

8. An assembly according to claim 1, including a heat block for isolating a flow of heat from the probe to the body.

9. An assembly according to claim 8, wherein the heat block:
    comprises a ceramic material; and/or,
    comprises a part of a coupler that couples the probe to the body; and/or
    is comprised of high temperature plastic material.

10. An assembly according to claim 1, wherein the electronics assembly includes a radio frequency (RF) Data communication interface sub-assembly coupled to the processor for the processor to transmit the signals for assessing to a remote server, and wherein the body includes a RF transparent window for passage of RF signals between the RF communication interface sub-assembly and the remote server.

11. An assembly according to claim 1, wherein the electronic assembly includes a MIMIC which is responsive to the antenna and which includes an automatic-gain-control (AGC) circuit wherein the processor is responsive to the AGC circuit to produce the signals indicating the presence of the partial discharge.

12. An assembly according to claim 1, wherein the body sensors include a vibration sensor and an acoustic sensor.

13. An assembly according to claim 1, wherein one of the probe sensors comprises:
    a hydrogen sensor for sensing hydrogen concentration in the tank; and/or,
    a moisture sensor.

14. An assembly according to claim 1, wherein:
    the processor is arranged to pre-process signals from said probe sensors and said body sensors and transmit pre-processed data to the remote server for the remote server to determine one or more of: transformer core temperature; transformer insulation state; partial discharge; mechanical state of transformer; chemical state of transformer; and/or
    one of the probe sensors includes a moisture sensor and wherein the processor and/or the server are configured to produce a signal indicating transformer insulation state taking into account a signal from the moisture sensor.

15. An assembly accordingly to claim 1, wherein the electronics assembly includes at least one body temperature sensor coupled to the processor, and wherein the plurality of probe sensors includes a probe temperature sensor for detecting temperature within the tank, wherein the processor is configured to estimate an ambient outside temperature taking into account signals from the probe temperature sensor and the at least one body temperature sensor.

16. A sensor assembly for monitoring an internal condition of a transformer comprising:
    a body for location outside a tank of the transformer, the body housing an electronics assembly including body sensors coupled to a processor, wherein the body sensors include a vibration sensor and an acoustic sensor;
    a probe including an elongate tube extending from the body for insertion into a tank of the transformer;
    a plurality of probe sensors coupled to the processor disposed at or toward a remote end of the elongate tube for sensing conditions within the tank;
    wherein the processor is configured to process signals from the probe sensors and the body sensors to produce signals for assessing one or more of: transformer core temperature; transformer insulation state; partial discharge; mechanical state of transformer; chemical state of transformer, wherein:
    the vibration sensor and the acoustic sensor comprise an accelerometer configured to measure vibration from the tank from sub hertz frequencies up to audible frequencies above 1000 Hz; and/or,
    one of the body sensors comprises a magnetic field sensor for sensing magnetic fields associated with operation of the transformer, wherein
    the plurality of probe sensors includes a probe antenna for detecting EM radiation associated with partial discharge, and wherein the processor is configured to correlate signals corresponding to the probe antenna and the magnetic field sensor to detect partial discharges occurring during operation of the transformer.

17. A method for assessing an internal condition of a transformer by use of a sensor assembly for monitoring an internal condition of a transformer comprising:
    a body for location outside a tank of the transformer, the body housing an electronics assembly including body sensors coupled to a processor;
    a probe including an elongate tube extending from the body for insertion into a tank of the transformer;
    a plurality of probe sensors coupled to the processor disposed at or toward a remote end of the elongate tube for sensing conditions within the tank;
        wherein the processor is configured to process signals from the probe sensors and the body sensors to produce signals for assessing one or more of: transformer core temperature; transformer insulation state; partial discharge; mechanical state of transformer; chemical state of transformer, the method comprising:
    inserting the elongate tube into the tank of the transformer to thereby install the plurality of probe sensors as a plurality of internal sensors within the transformer;
    installing the body of the sensor assembly outside of the transformer, the body sensors comprising external sensors adjacent an outside surface of the transformer;
    monitoring signals from the internal sensors and the external sensors including sampling the signals simultaneously; and
    making an assessment of the internal condition of the transformer based on a correlation of all of the signals sampled simultaneously.

18. A sensor assembly for monitoring an internal condition of a transformer comprising:
    a body for location outside a tank of the transformer, the body housing an electronics assembly including body sensors coupled to a processor;

a probe including an elongate tube extending from the body for insertion into a tank of the transformer;

a plurality of probe sensors coupled to the processor disposed at or toward a remote end of the elongate tube for sensing conditions within the tank;

wherein the processor is configured to process signals from the probe sensors and the body sensors to produce signals for assessing one or more of: transformer core temperature; transformer insulation state; partial discharge; mechanical state of transformer; chemical state of transformer, wherein the electronics assembly includes at least one magnetic field sensor coupled to the processor, and wherein the plurality of probe sensors includes a probe antenna for detecting EM radiation associated with partial discharge, wherein the processor is configured to correlate signals corresponding to the probe antenna and the magnetic field sensor to detect partial discharges occurring during operation of the transformer.

19. A sensor assembly system for monitoring an internal condition of a transformer comprising:

a body for location outside a tank of the transformer, the body housing an electronics assembly including body sensors coupled to a processor;

a probe including an elongate tube extending from the body for insertion into a tank of the transformer;

a plurality of probe sensors coupled to the processor disposed at or toward a remote end of the elongate tube for sensing conditions within the tank;

including a remote temperature sensor for sensing a temperature at a location on the transformer tank in combination with a remote server;

wherein the processor is configured to process signals from the probe sensors and the body sensors to produce signals for assessing one or more of: transformer core temperature; transformer insulation state; partial discharge; mechanical state of transformer; chemical state of transformer, and wherein the processor and/or the remote server are configured to:

determine a transformer load condition taking into account signals from the oil temperature sensor and the body temperature sensor, take into account signals from the oil temperature sensor, the remote temperature sensor and the body temperature sensor and the magnetic field sensor for determining a load of the transformer; and/or produce a signal indicating core temperature of the transformer taking into account signals from at least the oil temperature sensor and the body temperature sensor; and/or produce a signal indicating core temperature of the transformer taking into account signals from the oil temperature sensor, the body temperature sensor and the remote temperature sensor.

\* \* \* \* \*